US006753878B1

(12) United States Patent
Heirich et al.

(10) Patent No.: US 6,753,878 B1
(45) Date of Patent: Jun. 22, 2004

(54) PARALLEL PIPELINED MERGE ENGINES

(75) Inventors: Alan Heirich, Half Moon Bay, CA (US); Laurent Moll, Palo Alto, CA (US); Mark Shand, Palo Alto, CA (US); Albert Tam, Fremont, CA (US); Robert W. Horst, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/264,347

(22) Filed: Mar. 8, 1999

(51) Int. Cl.[7] .............................................. G06F 15/16
(52) U.S. Cl. ...................... 345/629; 345/619; 345/630; 345/632; 345/634
(58) Field of Search ........................ 345/629, 630–641, 345/790, 794, 619

(56) References Cited

U.S. PATENT DOCUMENTS

| | | | |
|---|---|---|---|
| 4,827,445 A | | 5/1989 | Fuchs ......................... 364/900 |
| 4,949,280 A | * | 8/1990 | Littlefield ................... 364/518 |
| 4,985,834 A | * | 1/1991 | Cline et al. ............ 364/413.22 |
| 5,264,837 A | * | 11/1993 | Buehler ....................... 345/115 |
| 5,276,798 A | * | 1/1994 | Peaslee et al. .............. 395/162 |
| 5,337,410 A | * | 8/1994 | Appel ......................... 345/501 |
| 5,394,524 A | * | 2/1995 | DiNicola et al. ........... 345/501 |
| 5,473,750 A | * | 12/1995 | Hattori ........................ 345/505 |
| 5,481,669 A | | 1/1996 | Poulton et al. ............. 395/164 |
| 5,546,530 A | * | 8/1996 | Grimaud et al. ............ 395/163 |
| 5,557,479 A | | 9/1996 | Yanagihara |
| 5,557,711 A | * | 9/1996 | Malzbender ................ 395/122 |
| 5,583,500 A | | 12/1996 | Allen |
| 5,583,974 A | | 12/1996 | Winner et al. .............. 395/122 |
| 5,621,465 A | | 4/1997 | Kondo |
| 5,761,401 A | * | 6/1998 | Kobayashi et al. ......... 395/130 |
| 5,841,444 A | * | 11/1998 | Mun et al. .................. 345/506 |
| 5,990,904 A | * | 11/1999 | Griffin ........................ 345/435 |
| 6,002,794 A | | 12/1999 | Bonneau |
| 6,052,126 A | | 4/2000 | Sakuraba |
| 6,222,937 B1 | | 4/2001 | Cohen |
| 6,292,194 B1 | | 9/2001 | Powell, III |

OTHER PUBLICATIONS

Torberg, John G., "A Parallel Processor Architecture for Graphics Arithmetic Operations", *Computer Graphics*, vol. 21, No. 4, pp. 197–204 (7/87).

Molnar, S., "Image–Composition Architectures for Real–Time Image Generation," UNC–CS Technical Report TR91–046, 1991 (Ph.D. dissertation) (Abstract only).

Molnar et al., "PixelFlow: High–Speed Rendering Using Image Composition," *Siggraph'92 Proceedings*, vol. 26, No. 2, pp. 231–240 (Jul. 1992).

Eyles et al., "PixelFlow: The Realization," *Proceedings of the 1997 Siggraph/Eurographics Workshop on Graphics Hardware*, Los Angeles, CA, Aug. 3–4, 1997, pp. 57–68.

Molnar, S., "Combining Z–buffer Engines for Higher–Speed Rendering," Advances in Computer Graphics Hardware III (Proceedings of Eurographics Workshop on Graphics Hardware), Eurographics Seminars, pp. 171–182 (1998).

\* cited by examiner

*Primary Examiner*—Matthew Luu
*Assistant Examiner*—Daniel J Chung

(57) ABSTRACT

An image generator is organized into a plurality of rendering engines, each of which renders an image of a part scene and provides the part image to a merge engine associated with that rendering engine. The image is a part image in that it usually contains less than all of the objects in the image to be rendered. The merge engine merges the part image from its associated rendering engine with the part image provided by a prior merge engine and provides the merged part image to a next merge engine. One or more merge engines are designated the output merge engines and these output merge engines output a merged part image that is (a portion of) the ultimate output of the image generator, the full rendered image. Each merge engine performs its merge process on the pixels it has from its rendering engine and from its prior neighbor merge engine, in a pipelined manner and without necessarily waiting for all of the pixels of the part image or the merged part image.

17 Claims, 8 Drawing Sheets

PARALLEL PIPELINED MERGE ENGINES

BACKGROUND OF THE INVENTION

The present invention relates to image generation in general and in particular to rendering engines for generating images that might be needed to be generated in real-time response to an input of objects in a scene.

Rendering is the process of computing a two-dimensional viewpoint dependent image of a three-dimensional geometric model. Rendering is computationally intensive, since a typical geometric model might contain objects that collectively comprise millions of polygons. In the typical rendering engine, a geometry stage first converts mathematical descriptions of arbitrarily complex objects into a collection of polygons, typically triangles, so that subsequent rendering stages only need to deal with simply polygons. The rendering stages then need to simulate the transport of light at various wavelengths emitted from numerous light sources in the geometric model and scattered by surfaces of objects in the geometric model.

Two common methods of handing light-object interactions are known as "ray tracing" and "radiosity" methods. If those methods are implemented in software, the software can take from minutes to days to produce a single high quality "photorealistic" image of a large geometric model. A typical photorealistic image might require a resolution of 2000 pixels by 1000 pixels and contain a million or more separately specified scene elements (i.e., objects or light sources). While days might be available for rendering some images, many applications require real-time rendering of video frames, such as computer games, flight simulators, scientific visualizers, computer-aided designcomputer-aided engineering (CAD/CAE) applications and medical data visualizers.

With real-time rendering of video frames, the delay allowed between the receipt of a geometric model and the output of the corresponding image is determined, in part, by the frame rate. In some applications, the frame rate can be as low as one frame per minute, so a viable rendering system for that application must produce at least one image per minute if it is to run at an acceptable rate. In many applications, such as computer animation or flight simulation, the rendering system is expected to run at thirty frames or more per second. In some thirty framesecond applications, the delay might need to be even less, as might be the case for a flight simulator or computer game having feedback. With such a system, an operator of the system provides inputs, such as commands to move up, down or sideways, and the corresponding changes to the geometric model are provided to a rendering engine. To avoid the feeling of "sea-sickness" that occurs when an image is out of sync with other stimuli, the rendering engine might have to generate an image from a geometry model in even less time than a frame period.

Existing software rendering engines are generally unable to meet such performance requirements, but some hardware rendering engines have been able to approach these performance requirements, although not always for a practical cost. Generally, in order to generate images of reasonable resolution in $1/30^{th}$ of a second or less, a hardware approach known as a "graphics pipeline" is used to achieve real-time image generation.

A graphics pipeline comprises a few well-understood stages: the geometry stage, the rendering stage and the composition stage. In a rendering engine with a graphics pipeline, some or all of these stages are implemented in parallel.

In the geometry stage, a database of geometric objects (usually triangles) is read from host memory and transformed from a world coordinate system ("object space") into a view dependent coordinate system ("screen space"). In some cases, the geometry stage might also perform the conversion of complex objects into simplified objects comprising polygons. Because all polygons can be represented as triangles, and processing triangles is simpler than processing polygons with more than three sides, nearly all existing rendering engines limit geometric objects to triangles. With triangles, each vertex is defined by a coordinate (x, y, z) and a surface normal vector (dx, dy, dz) and might also be defined by surface material properties (such as a coefficient of reflectivity and transmissivity) and the surface may be bound to textures. The geometry stage converts the vertex coordinates and normals from object space representations into their screen space counterparts (with a resolution being a function of the resolution of the output image) and discards objects that fall entirely outside the perimeter of the screen (the "view surface"). The geometry stage also performs lighting calculations, as needed, at the vertices for use by later stages that will interpolate these results at individual pixels.

Once the geometric model is represented as polygons in screen space, the rendering stage calculates the pixel color values that correspond to those polygons. Where the rendering stage is performed by a plurality of rendering engines, the composition stage combines the results from the parallel rendering engines to form the final image. With parallel processing, there are several considerations, such as load balancing and thread independence. The goal of load balancing is to ensure that the work to be done is evenly distributed over all of the parallel threads, to avoid having some threads idle while others are still processing. Thread independence is desirable, since independent threads will not be held up waiting for other threads to reach a certain point in their processing. Some thread dependence might be unavoidable, but such dependence might not always result in additional delays.

One approach to dividing up the work among a plurality of threads is known as the "sort-middle" architecture. In a "sort-middle" approach, the screen space is divided into tiles and each tile is assigned a bin, where the bin corresponds to the work one rendering thread will perform. The objects comprising the geometric stage's output are then allocated to the bins, with each object only being allocated to the bins of the tiles that the object intersects. Within each bin, a Z-comparison (depth comparison) is performed to determine which object is closest to the screen within each pixel of that bin's tile. Shading and blending calculations are then performed to compute the amount of light reflected at each wavelength (typically the three wavelengths r, g and b) by the closest object in each pixel, after textures have been taken into account. The result of this calculation is the color value (e.g., r, g and b values) of the pixel.

Another approach is the "sort-last" architecture wherein, instead of subdividing the screen, the objects are allocated randomly to the bins and each thread does a Z-comparison on the objects-in its bin. Each thread computes an entire screen image, albeit an incorrect one containing less than all of the objects in the geometric model. The Z (depth) information is stored along with the pixel color values.

The composition stage in a sort-middle architecture simply combines the subimages for each tile into the final image. The composition stage in a "sort-last" architecture uses the Z information to merge all of the part ("incorrect") images to produce a single correct image. With a sort-last composition stage, a merge engine is used to combine the part images by identifying which objects in which part images overlap which objects in other part images. In some cases, where there are many parallel threads, the composition stage might be done in parallel. Sort-last architectures typically provide better load balancing than sort-middle architectures, since some sort-middle threads might be allocated tiles that contain few or no objects.

The actual process of rendering, in a single thread, using hardware is highly developed and many products are available that can quickly render objects into images. Such products often support standard command sets, such as the OpenGL API (application programming interface), a low-level programming interface that is closely related to the architecture of the graphics pipeline. This standardization makes those products convenient for development of rendering engines. Another command set that is becoming a standard is the Direct3D API developed by Microsoft Corporation. Direct3D is a higher level programming interface that has been used on computers primarily for games.

Inexpensive rendering cards for personal computers are able to render about one million triangles per second. However, if a thirty framesecond video image is needed, the most complicated model that the rendering card could process in real-time would be limited to no more than about 33,000 triangles. Some computer games might be playable with such a limited number of triangles, but generating a photorealistic image with 33,000 triangles is difficult or impossible. Many CAD/CAE applications, such as those used by auto makers require finite element models with a hundred thousand to a million elements. To render an automotive model with a hundred thousand to a million triangular elements in real-time at thirty frames per second, a rendering engine would need to process three to thirty million triangles per second. A model with five million elements, which may be realistic within a few years, would require a rendering engine that can process 150 million triangles per second.

The bandwidth required at the input to the geometry stage of the graphics pipeline can be estimated from the model size. If a rendering card can process a large number of triangles/second, it cannot be used to its full capacity unless the communication channel to that rendering card can carry all of the data specifying those large numbers of triangles.

Each triangle is represented by at least three vertices, and each vertex by six floating point numbers (a coordinate and a surface normal vector) for a total of seventy-two bytes in the typical specification of a triangle. Surface normal vectors are usually defined at each vertex when the triangle represents a facet of a tessellated surface such as a spherical object. When this is not the case, the data requirements can be reduced by defining a common surface normal vector for all vertices. Another data reduction method is to use "triangle strips" which eliminate redundant vertex definitions, and require one additional vertex for each additional triangle. Worst case, a rendering card that can process one million triangles per second would require a 72 megabytesecond (MBS) communication bandwidth. Many rendering cards for personal computers communicate over a standard peripheral bus known as the PCI bus, and 72 MBS is about the achievable capacity of the current PCI bus. A system that renders three million triangles per second requires a bandwidth of roughly 216 MBS. This bandwidth should be achievable over newer buses, such as Intel's Accelerated Graphics Port (AGP) bus.

Even if a rendering system could render 30 to 150 million triangles/second, it would require a communication channel that could handle from two to eleven gigabytessecond (GBS), which most certainly would require parallel threads for communication. While several high-performance rendering engines that use parallel processing are available, they are often quite costly and not scalable.

SUMMARY OF THE INVENTION

The present invention overcomes several disadvantages of the prior art methods and apparatus for generating images.

In one embodiment of an image generator according to the present invention, the image generator is organized into a plurality of rendering engines, each of which renders an image of a part scene and provides the part image to a merge engine associated with that rendering engine. The image is a part image in that it usually contains less than all of the objects in the image to be rendered. The merge engine merges the part image from its associated rendering engine with the part image provided by a prior merge engine (the prior neighbor in a merge engine sequence) and provides the merged part image to a next merge engine (the next neighbor in a merge engine sequence). One or more merge engines are designated as output merge engines and these output merge engines output a merged part image that is (a portion of) the ultimate output of the image generator, the full rendered image. Each merge engine performs its merge process on the pixels it has from its rendering engine and from its prior neighbor merge engine, without necessarily waiting for all of the pixels of the part image or the merged part image.

One advantage of the image generator is that the operations of the merge engines are pipelined, since they operate on pixels as they arrive, if an operation can be done on the arrived pixels, instead of waiting for all pixels to arrive.

In one variation of the basic image generator, the merge sequence is dynamic. In one such embodiment, the merge engines are coupled to a switch network where the switch network determines which merge engines are prior neighbors and next neighbors to which merge engines. Preferably, the switch network makes those determinations based on the objects being provided to the individual rendering engines.

The image generator can be used for a variety of image compositing and "two-and-a-half-D" applications, which combine 3D rendering, 2D overlays and special operations including color correction, dissolves, blending and other transformations.

A further understanding of the nature and advantages of the inventions herein may be realized by reference to the remaining portions of the specification and the attached drawings.

DESCRIPTION OF THE PREFERRED EMBODIMENTS

The present invention has many applications, as will be apparent after reading this disclosure. In describing an embodiment of an image generator according to the present invention, only a few of the possible variations are described. Other applications and variations will be apparent to one of ordinary skill in the art, so the invention should not be construed as narrowly as the examples, but rather in accordance with the appended claims.

Figure 1:
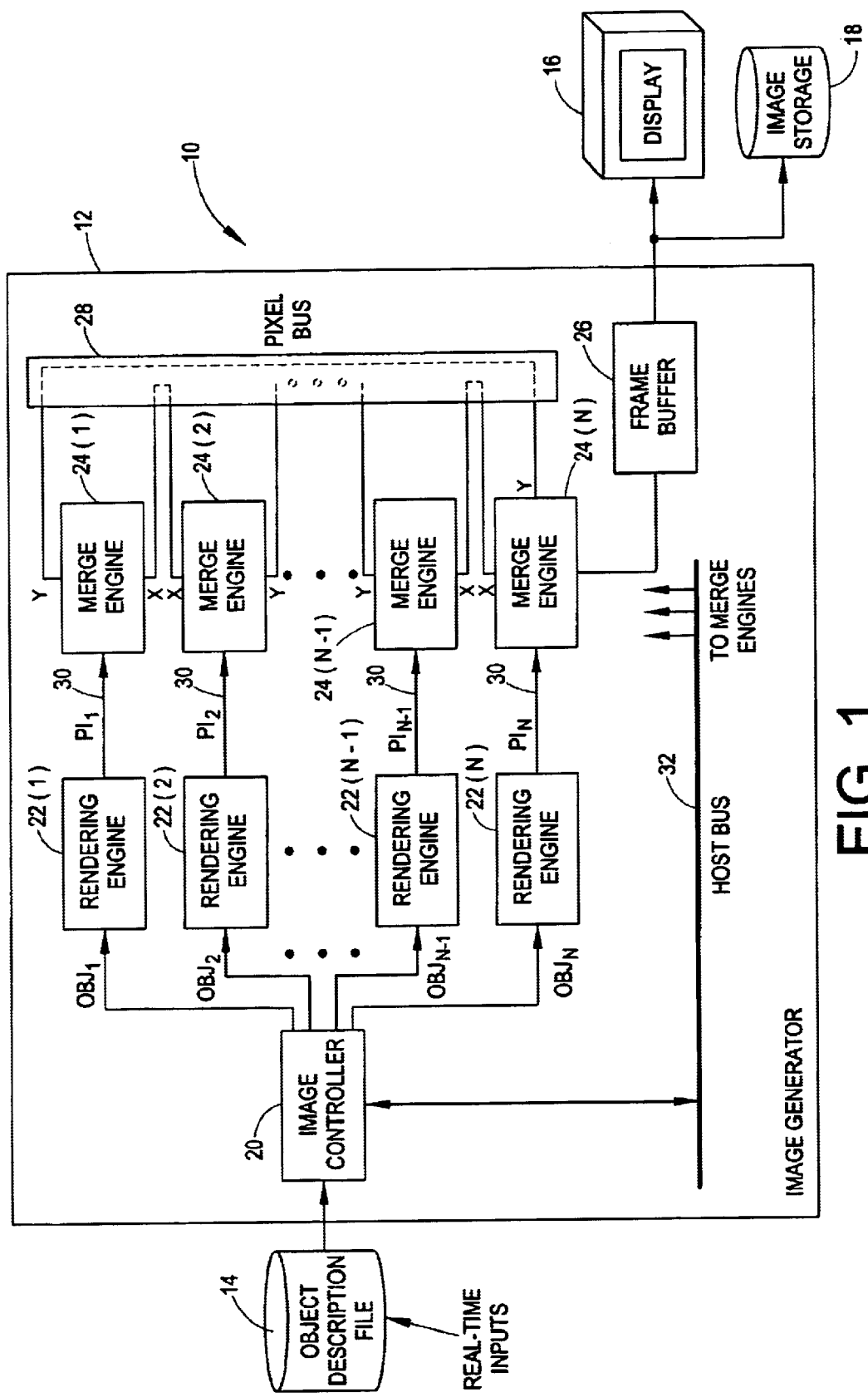
FIG. 1 is a block diagram of an image generator according to one embodiment of the present invention.

The construction and operation of a basic image generator according to one embodiment of the present invention is shown in FIG. 1. There, a graphics system 10 is shown with an image generator 12 as might be used to render an image from an object description file 14 and to present a rendered set of pixel color values to a display 16 or an image store 18. Object description file 14 can be any type of data file or stream of expressions that indicate where objects and light sources are in a scene, as well as other parameters needed to render an image according to conventional methods. While only two output devices are shown, the output of image generator 12 might be used in other ways, such as being fed into another computer system or program for further analysis and/or processing of the rendered image, or any other use typically made of rendered images.

The image generator itself is shown comprising an image controller 20, a plurality of rendering engines 22, a plurality of merge engines 24 and a frame store 26. In many implementations a paired set of a rendering engine and an associated merge engine might be implemented on one workstation, as described below in reference to later figures, but this description of the basic system is not limited to any particular limitation on the allocation of the physical hardware. Herein, when refereing specific rendering engine or merge engine (or any other individual from a plurality), an index is indicated, as in "22($i$)" or "$22_i$" to identify the i-th rendering engine. In FIG. 1, rendering engines 22(1), 22(2), 22(N-1) and 22(N) are shown and, for N>4, rendering engines 22(3) through 22(N-2) are implied.

The data paths and connections shown in FIG. 1 provide for an input of an object description file to image controller 20 and for transfer of subsets of the objects to rendering engines 22, e.g., object(s) $OBJ_1$ to image controller 22(1), object(s) OBJ2 to image controller 22(2), etc., in a "sort-last" or "sort-middle" manner. In some embodiments, image controller 20 might be configured to send only one object to each rendering engine 22, i.e., the description $OBJ_i$ is the description of just one object. However, in other embodiments, image controller 20 might send multiple objects to one or more rendering engine, to load balance (i.e., give each rendering engine roughly the same amount of work to do) or to distribute all of the objects at once when there are more than N objects in the scene. Image controller 20 is shown in FIG. 1 as one unit, but in some embodiments, image controller 20 is implemented as a distributed application. In those embodiments, the application might be distributed over a collection of machines that are the same machines that are hosting the rendering engines 22 and merge engines 24. If that is the case, then host bus 32 might be replaced with a set of host busses, one per host, to connect the host component of the image controller to its corresponding rendering engine and merge engine.

A data path is provided between each rendering engine 22 and its corresponding merge engine 24 for communicating a part image from the rendering engine to the merge engine, wherein the part image $PI_i$ communicated from rendering engine 22($i$) to merge engine 24($i$) is a rendered image of the object(s) described by $OBJ_i$. Each of the merge engines 24 is also provided with a data path to its nearest prior neighbor and its nearest next neighbor. Thus, for merge engine 24($i$), a data path is provided from merge engine 24(i–1) and a data path is provided to merge engine 24(i+1). Merge engines are logically arranged in a ring, so that the nearest prior neighbor to merge engine 24(1) is merge engine 24(N) and the nearest next neighbor to merge engine 24(N) is 24(1). It should be understood that, where N elements (numbered from 1 to N) are described herein as being in a ring and the i-th instance of an element is referenced, "i–1" and "i+1" refer to the i-th elements' nearest neighbor, and because of the ring arrangement, for i=1, "i–1" refers to the N-th element and, for i=N, "i+1" refers to the first element.

The data paths between merge engine neighbors can be direct connections, but the embodiment shown in FIG. 1 uses a high-speed pixel bus 28 to carry the traffic between merge engines. One suitable high-speed bus is the ServerNet® network developed by Tandem Computers Incorporated. The ServerNet® network is described in Heirich, Garcia, Knowles and Horst, "ServerNet-II: A Commodity Interconnect for Scalable High Performance Cluster Computing", which is incorporated by reference herein for all purposes.

One of the merge engines 24 is designated as the output merge engine. In FIG. 1, the designated output merge engine is merge engine 24(N), which is provided with a data path to a frame buffer 26 and holds the output of image generator 12, which is a merged image of all of the part images PI. In some implementations, where the rendering engines already include suitable frame buffers, the frame buffer of rendering engine 24(N) is used instead of a dedicated frame buffer such as frame buffer 26. Some implementations might also use more than one output merge engine. Other connections might be provided but not shown as described herein.

As described below, one advantage of the arrangement shown in FIG. 1 is that the merger of part images is done in a pipeline, with pixel values forming the part images and merge images streaming from the rendering engines and merge engines as they become available. Thus, as one merge engine completes the merger of a block of pixels streamed from its corresponding rendering engine with a block of pixels streamed from the merge engine's nearest prior neighbor, it passes the merged block on to its nearest next neighbor. The block of pixels can range in size from one pixel to the number of pixels in the image, but as the block size approaches the number of pixels in the image, the benefits of pipelining diminish, and are not obtained when the block size is the size of the image. In one prototype, the image size is 307,200 pixels (640 by 480 pixels) and the block size is 8 pixels.

The link between 24(N) and 24(1) is omitted in some configurations that do not require recirculation of intermediate image results, depending on the nature of the rendering process being employed. However, in general, the link is included.

In image generator 12, each merge engine 24 acquires image data from its corresponding rendering engine 22 through a render-merge interface 30. Where rendering engines 22 are standard graphics accelerator cards with PCI interfaces, render-merge interface 30 can be a PCI interface, but a private digital interface that performs better than PCI interfaces might be preferred. Each merge engine 24 receives pixel color values, and other data, from its corresponding rendering engine 22 and also receives image data from its nearest prior neighbor via high-speed pixel bus 28. Where pixel bus 28 is implemented using a ServerNet® network, the interface to pixel bus 28 could be implemented using a ServerNet® "Colorado" application-specific integrated circuit (ASIC) developed by Tandem Computers Incorporated for handling communications over a ServerNet® network. A merge engine 24(i) combines its two streams of image data to produce a third stream, which is sent through an outgoing connection on ASIC to the next merge engine 24(i+1) in the pathway. At one or more points in the pathway, a merge engine will push the combined imagery onto a frame buffer to allow for display of the image. The ASIC is documented in detail in the "Colorado External Specification", Tandem Computers Document Number 122219-X05 dated Oct. 14, 1997, which is incorporated by reference herein for all purposes.

Image generator 12 might advantageously be built from readily available graphics components, to reduce the design efforts and costs of an image generator. For example, as explained above, rendering engines 22 could be standard graphics accelerator cards and merge engines 24 could incorporate an existing driver for a ServerNet® network interface, such as the Colorado ASIC.

A typical, off-the-shelf commodity graphics card has a PCI bus interface (a standardized bus used for inter-board communications in desktop computers) for receiving object descriptions and can render a few million triangles per second (objects are typically broken down into collections of triangles for rendering). An image generator 12 is usually "parallelized" to overcome limits in of processing speed in each thread or limits in bandwidth into, out of, or internal to, the thread. Where processing speed is the stricter constraint, the number of "rendering threads"("N" in the examples described herein) is determined by dividing the maximum number of triangles/second needed in the application by the number of triangles/second processable by one thread (which is often limited to the number of triangles/second processed by the rendering card that forms part of the thread). Where bandwidth at the input of the rendering stage is the stricter constraint, N would need to be at least the overall bandwidth of the geometry stage output divided by the bandwidth of one card's input. In two specific prototypes, N=6 and N=8.

In some cases, the output bandwidth of the rendering stages is a constraint. Typically, each rendering engine will produce a stream of thirty frames/second of video. Each pixel on the output might comprise 24 bits of color information (8 bits each for red, green and blue), 16 to 32 bits of Z (depth) information, and possibly an additional eight bits of alpha (transparency) data, totaling from 40 to 60 bits of data. In high-end motion picture applications, 12 bits/color might be the norm, resulting in a minimum of 52 bits. For NTSC television video, the typical format is 30 frames/second with each frame comprising 640 pixels by 480 pixels, for a total of 307,200 pixels per frame. Thus NTSC rendering engines would output between 44 and 70 MBS of data. In the near future, television will expand to the HDTV format, with its approximately 2000×1000 pixel frames, requiring a bandwidth of between 286 and 455 megabytes/second.

Figure 2:
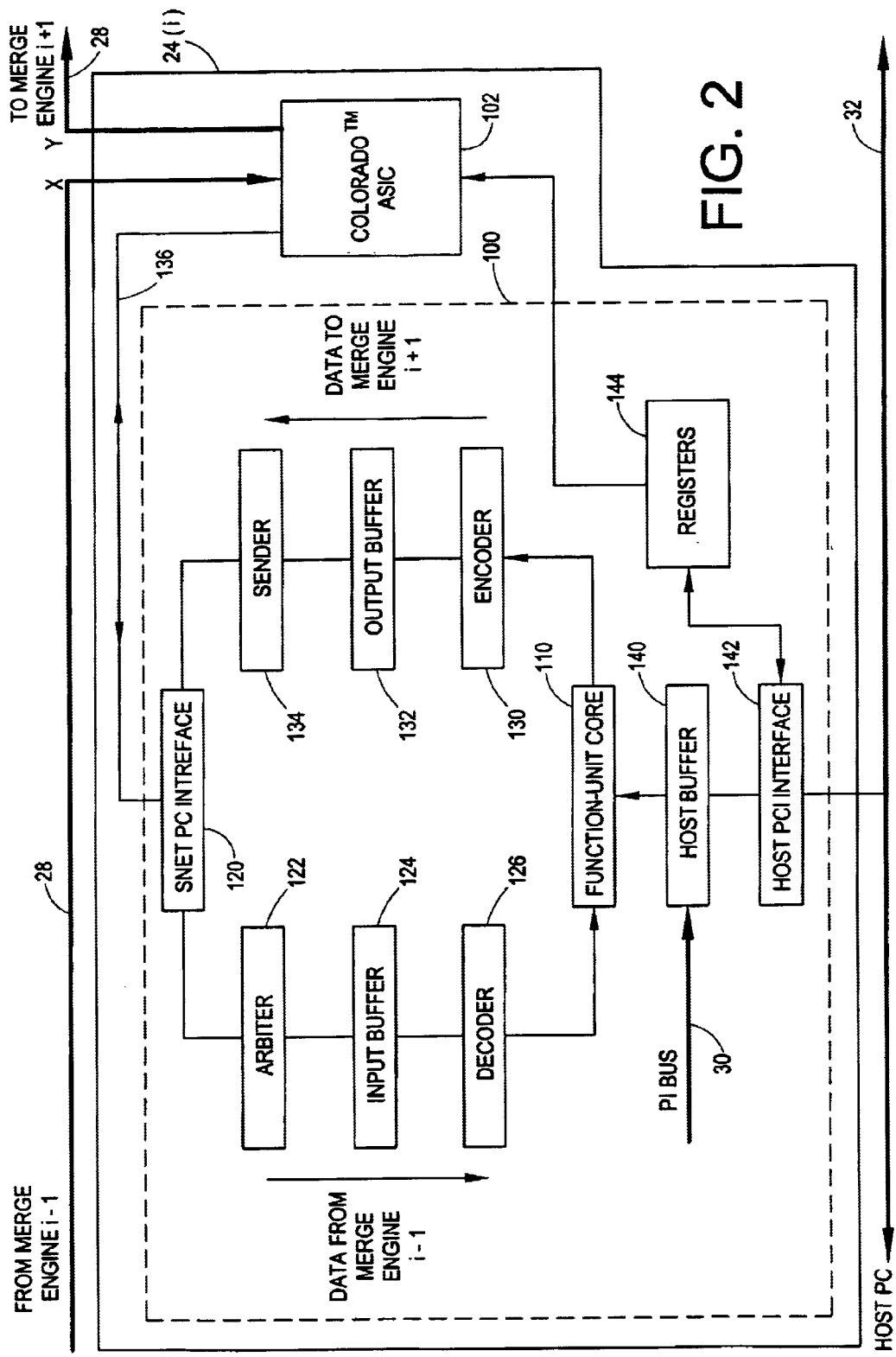
FIG. 2 is a block diagram of a merge engine as might be used in the image generator of FIG. 1.

FIG. 2 is a block diagram showing one merge engine 24(i) in further detail. Merge engine 24(i) is logically arranged into merge engine logic 100 and a merge engine interface circuit 102 for connecting neighboring merge engines and merge engine interface circuit 102 uses an ASIC for handling the communication between merge engines over a network such as a ServerNet® network. Other connection approaches could be used, but using an ASIC that is used for other applications has well-known advantages, such as the fact that it eliminates the need to design communications logic specifically for the merge engine communication and having a broader base of uses for any given ASIC distributes the design costs over more chips, thus reducing the per-chip design costs. In combination with the use of off-the-shelf components for the rendering ;engines and the use of an already designed ASIC for communications, the N pipeline stages of an image generator can be implemented very economically.

Three interfaces are shown in FIG. 2. At the top, an ASIC 102 connects the merge engine to its nearest neighbors over pixel bus 28. The other two interfaces are a part image bus 30 between the merge engine and its corresponding rendering engine and a host PCI bus 32 between the merge engine and a host which is used for device initialization and host control.

The connections to pixel bus 28 are labeled "x" and "y", as those are the two channels provided by the Colorado ASIC. The Colorado ASIC makes the design of the merge engine shown herein quite cost effective, especially since the ASICs can be used essentially unchanged. Each ASIC has two ports (termed "x" and "y") that are usually used redundantly to provide fault tolerance. In a basic embodiment, the "x" and "y" points are used for data flow in one direction, but in other embodiments, those parts, which are bi-directional, are used to carry data in both directions, giving higher effective bandwidth and frame rate.

Merge engine logic 100 comprises various elements for communication between a function-unit core (core 110) 110 and the three interfaces. Core 110 operates on pixel streams arriving at the merge engine over pixel bus 28 (from other merge engines) and over part image bus 30 from an associated rendering engine. In particular, core 110 performs operations on pairs of pixels.

Core 110 is connected to ASIC 102 through a PCI interface unit 120. Incoming pixel data flows from PCI interface unit 120 through an arbiter 122, an input buffer 124 and a decoder 126, while outgoing pixel data flows from core 110 to PCI interface unit 120 through an encoder 130, an output buffer 132 and a sender 134.

When image data is transferred from one merge engine to its nearest next neighbor, the image data is transferred as a message of a fixed multiple of the ServerNet® network packet data size. When a message arrives on the input to ASIC 102, ASIC 102 passes the message into input buffer 124 via PCI interface unit 120 and arbiter 122. The PCI bus 136 between ASIC 102 and merge engine logic 100 is not required, as other bus protocols might be used, but with a standard PCI interface to merge engine logic 100, the existing interface of the Colorado ASIC need not be redesigned.

At the same time that the message arrives from ASIC 102, another message of the same length arrives over the part image bus 30 into a host buffer 140. Core logic handles flow control, packet synchronization, and data transfers between the merge engine and rendering engine. With the arrival of these two messages, core 110 can perform pixel-by-pixel computations on these two messages to produce a result message with the same fixed length. The details of the possible computations are described below with reference to core 110 operation. The result message is sent to ASIC 102 for transmission to the merge engine 24(i+1).

Merge engine 24(i) usually operates on two input streams of pixel data: one from merge engine 24(i−1) and one from rendering engine 22(i) and usually produces a single output stream of pixel data, which is sent downstream to the merge engine 24(i+1). In some cases, the merge engine may use only a single input stream, may obtain additional data from a host, and/or may write its output stream to the host. These operating modes are defined by control registers in the merge engine that may be set independently by the host or by control tokens arriving over pixel bus 28.

Input pixel data is written into input buffer 124, which is a circular buffer, unless access to input buffer 124 is denied by the arbiter 122. Decoder 126 removes data from input buffer 124 and decompresses the data, one pixel at a time, at the request of core 110. In some implementations, compression is not used and decoder 126 and encoder 130 are not needed. Decoder 126 informs arbiter 122 whether input buffer 124 has room to accept new incoming data and arbiter 122 uses this information to decide when to deny access to input buffer 124.

Host buffer 140 unit supplies data to core 110, one pixel at a time, at the request of the core 110. Host buffer 140 contains data from up to four separate segments of host address space, in blocks that are sufficiently large to ensure that data is always available when requested by core 110. Host buffer 140 is bi-directional, in that it will also buffer data being sent from core 110.

In the normal course of operations, core 110 requests data for one pixel from decoder 126 and one pixel from host buffer 140. It uses that data to compute values for one new pixel, which core 110 then provides to encoder 130. Encoder 130, when requested by the core 110, compresses the data for a pixel and inserts the result into output buffer 132, which is also a circular buffer. Encoder 130 informs sender 134 when output buffer 132 contains enough data to send downstream. When this happens, sender 134 generates the appropriate PCI transactions to move the data from output buffer 132 to the input buffer 124 of merge engine 24(i+1) via ASIC 102.

The first merge engine in the pipeline, merge engine 24(1), usually reads an input stream of pixel data and passes it downstream to merge engine 24(2) without accepting any pixel data from the upstream direction. In some situations, such as a redistribution of Z buffer data, a merge engine will read an input stream from its nearest prior neighbor without taking any data from its rendering engine. In the normal course of operations, the final merge engine 24(N) will write an output stream of pixel data to memory on a frame buffer of rendering engine 24(N) or frame buffer 26, but will not send data downstream. During Z buffer redistribution, every merge engine except 24(N) will write an output stream of Z information to the host rendering engine and also to its next nearest neighbor.

In order to support high-speed multi-pass processing, control messages might be sent along the merge pathway to modify status, control and address registers within the merge engines. These registers are shown in FIG. 2 as registers 144 and are described in further detail below. Each merge engine is assigned a group identifier, GID, and every control message contains a GID. When a merge engine receives a message over pixel bus 28, it compares its GID to the GID found in the message and processes the messages addressed to it, possibly changing some contents of registers 144 in the process. In either case, the merge engine propagates the control message downstream, unless a "do not propagate" control bit in the message is set.

Arbiter 122 implements flow control for input buffer 124, telling decoder 126 when fresh data is available, and preventing the upstream sender 134 from overwriting active data that has not yet been decoded. Arbiter 122 is also responsible for recognizing control messages when they arrive and routing them to the appropriate logic.

Input buffer 124 is a circular buffer that holds pixel data that is waiting to be decoded by decoder 126 (if compression is used) and consumed by the core 110. Core 110 will most likely consume data more quickly than pixel bus 28 can deliver it, so there is little chance of overflow in normal operation and input buffer 124 can be a simple double buffer. It will accept a data and address interface from arbiter 122 and export an interface to decoder 126 that will provide one byte at a time in FIFO order.

Decoder 126 unit decompresses pixel data (if compression is used). One suitable compression scheme is that described in (U.S. patent application Ser. No. 09/264348 filed on the same day as the instant application entitled First Order Difference Composition For Interleaved Image Data In High-Speed Image Compositor. If compression is used, decoder 126 decompresses data from input buffer 124, one byte at a time, until it accumulates the data for an entire pixel (usually between 5 and 8 decompressed bytes). Decoder 126 then passes the decompressed result to core 110 when core 110 requests a pixel. Flow control between decoder 126 and core 110 is implemented by a handshake.

Core 110 is the computational heart of merge engine 24. Core 110 takes as input the data for a single pixel from decoder 126 and data for a single pixel from host buffer 140. Under some circumstances, core 110 may take additional data from host buffer 140. Core 110 produces result data for a single pixel, which may be sent to encoder 130, host buffer 140 or both. Under some circumstances, the result data might be combined with additional data from host buffer 140 in a two-stage computation. Flow control is implemented by handshakes between decoder 126 and core 110, host buffer 140 and core 110, core 110 and encoder 130, and core 110 and host buffer 140.

Core 110 should not compute the next pixel until it receives handshakes from decoder 126 and host buffer 140 (if two input streams are active) to confirm the data is ready; after core 110 sends the data for the new pixel to encoder 130, core 110 should not generate more pixel data until it receives acknowledgments from encoder 130 (and host buffer 140, if it is an active destination).

The functions of core 110 will now be described. At least two computations should be supported: a Z comparison operation, in which one of the two input pixels is discarded based on their relative Z values, and a blend operation, in which transparent pixels are blended using a variety of blending formulas. Other pixel operations can easily be added to support commercially important markets, including image compositing and digital special effects.

Core 110 processes data that corresponds to image pixels and Z (depth) information. A pixel is usually defined as 24 bits, 8 bits each for R, G, and B color data, or as 32 bits, with an additional 8 bits of "alpha" transparency data. The Z information for a pixel is usually defined by a 16, 24, or 32-bit integer. In a specific implementation, the design of core 110 should not preclude supporting higher numbers of bits in either pixel or Z data. Although the computations of merge engine logic 100 are defined in terms of individual pixels, it should be understood that the computation would proceed most efficiently when blocks of pixels are processed together.

Core 110 will perform different computations in different operating modes. In some circumstances, core 110 may not even perform computation on the data, but may pass the data through unchanged.

One operation is a Z comparison, which is expected to comprise nearly 95% of the operations performed by a core. for this operation, given two pixels P1 (R1, G1, B1 ,Z1) and P2 (R2, G2, B2, Z2), if (Z1<Z2) then the result pixel is P1, otherwise the result pixel is P2.

A more complex operation is "blending" to handle atmospheric effects and transparency.

Alpha blending is used to render transparent surfaces and is the basis for volume rendering. Instead of computing a pixel color from a single polygon, a rendering system can treat polygons as semitransparent objects (for example, the windshield of an automobile) and compute pixel colors by blending the colors of a number of polygons along a single line of sight. Each polygon has an associated "alpha" coefficient, between zero and one, that determines its relative transparency. The blending operation is not commutative, which means that it must be computed in order along a line of sight. This poses some challenges for any parallel rendering architecture because it means that the relative positions of objects must be maintained through the pipeline.

For a blending operation, given two pixels P1 (R1, G1, B1, A1, Z1) and P2 (R2, G2, B2, A2, Z2), with alpha values A1 and A2 being between 0 and 1, the result pixel, PR, may be computed as:

$$PR=(F(A1,R1,R2), F(A1,G1,G2),F(A1,B1,B2), F(A1,A1,A2), MIN(Z1,Z2)),$$

where F(a,b,c):=a*b+(1−a)*c

Other operations could be defined in order to support digital effects and image processing, preferably limited to operations on a pair of pixels that produce a pixel result. Some examples include pixel difference, min, max, dissolve, color filters, and the like. The data for each pixel might also include data on the nature of the computation to perform on that pixel, as well as the data to be used in that computation, to provide an advantage over systems that cannot specify this on a per-pixel basis.

Other operations might involve moving data, synchronization or signaling. For example, a data pass-through operation might be provided, wherein a merge engine passes a stream of data from either input (host PCI or ASIC) to its output, unmodified. Merge engine 24(1) will often have to do this in order to feed the head of a merge pipeline. Preferably, pixel data or Z data can be passed independently and from either input.

Another operation is data broadcast, as might be used in connection with a multi-pass algorithm to render transparent surfaces, it will be necessary to broadcast data from one frame buffer to some or all other frame buffers. For example, a model containing transparent components can be rendered by first rendering all of the opaque components, merging the results, and then reloading all of the Z buffers with the merged Z result before proceeding to render the transparent components. The pixel data and/or the Z buffer data can be written to the host from data arriving over the ASIC input.

Another operation, typically performed by merge engine 24(N), is the write out of results to the final frame buffer. This operation might be useful in other stages of the pipeline, or for other operations that would require circulating data multiple times between a merge engine and its host.

If the merge engine is created using FPGA's as described above, the operations performed by the merge engine can be updated as needed by reprogramming the FPGA's.

One implementation of a merge engine uses a custom-designed board that plugs into a PCI slot of a workstation, where the merge engine board contains a ServerNet® Colorado ASIC and commodity and custom circuitry to perform pixel compositing, blending and other operations, as well as to transfer data in and out of workstation memory. The merge engines are connected in series into a (logical or physical) ring topology. In a simple, cost-effective configuration, these boards are connected in a daisy-chained ring among a set of workstations. In more complex configuration, the boards are connected to a switch fabric to increase throughput, provide fault tolerance or to support specialized applications like volume visualization.

The above operations, and other merge engine capabilities, describe mutually exclusive modes in which the merge engines may operate. A mechanism exists for configuring these modes at run time. In the simplest case, every host is responsible for writing a register in merge engine (see the description of the register set below) that determines the current operating mode of that merge engine. An alternative mechanism that would be faster uses the merge engines to pass control tokens through pixel bus 28. Cores 110 would then reconfigure themselves in response to receiving one of these control tokens. An entire pipeline could be configured in a single operating mode simply by having one host instruct a merge engine to place a control token into the data flowing through the pipeline. In that case, it would be useful to assign group identifiers to the merge engines, so that control tokens can be destined for subsets of merge engines without necessarily affecting all merge engines.

An instance of this problem arises with respect to pipeline synchronization. In order to achieve low pipeline latency, the pipeline stages should be overlapped as much as possible. The set of graphics accelerators in the rendering engines 22 will usually show some variation in the amount of real time they require in order to produce their pixel and Z data. The merge pathway cannot operate until all graphics accelerators have produced their data, and therefore barrier synchronization is required between the rendering and merge operations. Note that rendering can still overlap merging, since the frame buffers are typically double-buffered and the graphics accelerator can start work on the next image while the merge engines are working on the current image. Barrier synchronization accomplished in software will take milliseconds and thus is clearly unacceptable. A distributed synchronization algorithm is implemented in merge engines in order to initiate merging for each image. The following simple process is used in one embodiment by each merge engine MEi:

If (MEi+1 asserts "ready" and frame buffer FBi has data) then
   If (i>1) then [assert "ready"] else [start the data flowing into the pipeline]

Referring now to encoder 130, that element accepts one pixel of data from core 110, compresses it, and writes the compressed result to output buffer 132. Encoder 130 exports a flag to sender 134 to request transmission of the contents of output buffer 132 downstream to the input buffer of the next merge engine. Encoder 130 also accepts a flag from sender 134 that indicates which half of output buffer 132 encoder 130 should write into. If encoder 130 recognizes that it is about to overwrite data that has not yet been sent downstream (which should only occur if sender 134 is blocked from sending downstream) then encoder 130 will not execute the handshake with core 110 and thus will effectively block further computation in core 110. Otherwise, encoder 130 sends an acknowledgment to core 110 when encoder 130 has encoded the pixel data and written it into output buffer 132.

Output buffer 132 is a double buffer similar to input buffer 124. The contents of output buffer 132 are accessible to sender 134 so that sender 134 can generate the PCI transactions required to transfer the contents to the input buffer of the next merge engine.

Sender 134 is a data movement mechanism, such as a DMA engine, that pushes data, one packet at a time, from output buffer 132 to PCI bus 136 between sender 134 and ASIC 102. Since sender 134 uses normal PCI arbitration to gain access to PCI bus 136, the flow control mechanisms described previously for arbiter 122 will ensure that sender 134 does not overwrite active downstream data. Flow control in the reverse direction is accomplished by exporting a bit flag to tell encoder 130 which half of output buffer 132 to write into. In the switched configurations described below, sender 134 is responsible for splitting the outgoing data stream across two links.

A set of control, status and address registers 144 are provided in each merge engine 24. The registers are always accessible to the host through host PCI bus 32, although the design of merge engine 24 might include a constraint that the host is not allowed, or expected, to modify some of the registers while computations are occurring in core 110. The registers 144 are also accessible to other merge engines, through the use of control messages passed from merge engine to merge engine over pixel bus 28. If pixel bus 28 is a ServerNet® network bus, this feature can be used to implement a variety of control operations at high speed without involving the individual hosts. The registers are logically arranged in a PCI address space, so they can be read by an adjacent merge engine via ASIC 102 using standard PCI commands.

Host buffer 140 transfers pixel data from up to four independent segments of host PCI address space, buffers it, and assembles it into pixel format for use by core 110. Host buffer 140, or host PCI interface 142 maintains and increments appropriate address registers so that the transfers can occur in bursts in a predetermined order. The data is transferred to core 110 when core 110 requests the data. Flow control is implemented by a simple handshake, so that if host buffer 140 is ever depleted, computations of core 110 would suspend until data became available. Host buffer 140 can transfer data from separate address areas for R, G, B, alpha and Z data. The alpha data is optional and Z data may be 2, 3 or 4 bytes long for each pixel. The data for each pixel is transferred to core 110 in a format that matches the data arriving over pixel bus 28 via ASIC 102, which is usually in the following order: R, G, B, a, Z (a optional).

Host buffer 140 is bi-directional or made up of a host input buffer and a host output buffer. As an output buffer, host PCI interface 142 transfers pixel data from core 110 back to the host's address space. Host buffer 140 supports the same modes, buffering and address spaces in both directions, and as an output buffer, host PCI interface 142 splits the pixel data from core 110 into separate streams if required by the host's storage format. Host PCI interface 142 exchanges a handshake with core 110 to confirm that each pixel has been accepted; if host PCI interface 142 withholds this handshake, core 110 will not produce further pixel data until the handshake occurs.

Since the control, status, and address registers 144 are all visible on PCI bus 136, they are also visible across pixel bus 28 to the upstream and downstream merge engines. It is therefore possible for a merge engine to evaluate the state of either of its nearest neighbors by reading the status registers, and to change this state by writing control and/or address registers. This capability is important for implementing high-speed control operations on the pipeline. Such operations are much faster when they are implemented in this way rather than by requiring every host to participate.

Performing these operations at high speed (on the order of milliseconds) is important for achieving high performance for multi-pass rendering algorithms that are commonly used for high quality animation and some games.

The exact set of registers is dependent on the particular implementation, but one exemplary set of registers is shown below. One system design allows the host associated with merge engine 24(1) to write to a set of shadow registers in merge engine 24(1) and then command merge engine 24(1) to copy the shadow register values to a set of shadow registers in merge engine 24(2). Merge engine 24(2) then determines whether to overwrite its registers with the shadow register values and to overwrite the registers if merge engine 24(2) determines that it would be appropriate to do so. Merge engine 24(2) can then write the shadow register values to merge engine 24(3) and so on. Each merge engine uses an identity mask to decide whether to overwrite its local set of registers with the shadow register values. If the value of a merge engine's local identity mask matches the value of the shadow register identity mask, and then the merge engine accepts the register values, otherwise the merge engine ignores them. This allows different merge engines to be configured differently. For example, merge engine 24(1) and 24(N) are nearly always configured differently from the other merge engines.

The following tables describe the structure of various registers that might make up registers 144 of a merge engine and how their contents are used. Table 1 lists the fields of a status register and Table 2 lists the fields of a control register. The status register and control register are always readable by the merge engine's host.

TABLE 1

STATUS REGISTER

| Field | # of bits | Values | Description |
|---|---|---|---|
| IsRunning | 1 | false, true | |
| IsException | 1 | false, true | |
| IsReset | 1 | false, true | |
| IsResetFrame | 1 | false, true | |
| GroupId (GID) | 8 | 0–255 | |
| IOMode | 4 | 0000-1111 | Inclusive OR of SnetIn, SnetOut, HostIn, HostOut |
| PixelFormat | 4 | 0000-1111 | Inclusive OR of (R, G, B, alpha, Z, reserved) |
| RgbLength | 2 | 00 = 16 bits 01 = 24 bits 10 = reserved 11 = reserved | Length of RGB pixel data in bits |
| AlphaLength | 2 | 00 = 8 bits 01 = reserved 10 = reserved 11 = reserved | Length of alpha pixel data in bits |
| Zlength | 3 | 0–7 | Length of Z pixel data in bytes, minus two |

TABLE 2

CONTROL REGISTER

| Field | # of bits | Description |
|---|---|---|
| StopRunning | 1 | Set high to stop merge engine logic 100 from running |
| AssertException | 1 | Set high to assert exception |
| Reset | 1 | Set high to reset merge engine |
| ResetFrame | 1 | Set high to reset current frame |
| Snapshot | 1 | Set high to snapshot all internal states |
| NoPropagate | 1 | Set high to prevent propagation of control messages |

Registers 144 also include a snapshot register, an M-byte register, which holds an M-byte result of a last snapshot request. The snapshot register is readable when the merge engine is stopped. Registers 144 also include an ASIC address register and an ASIC data register used for accessing the state of ASIC 102. The ASIC address register is an eight-byte register that indicates a target of the data held in the ASIC data register.

Two other registers in registers 144 are host readable and writeable, but only when the merge engine is stopped. Those two registers are an address register, the fields of which are shown in Table 3, and a controlstatus register, the fields of which are shown in Table 4.

TABLE 3

ADDRESS REGISTER

| Field | Description |
|---|---|
| HostInRgb | Base address for reading frame buffer pixels |
| HostInAlpha | Base address for reading frame buffer alpha |
| HostInZ | Base address for reading Z buffer |
| HostOutRgb | Base address for writing frame buffer pixels |
| HostOutAlpha | Base address for writing frame buffer alpha |
| HostOutZ | Base address for writing Z buffer |

TABLE 4

CONTROL/STATUS REGISTER

| Field | # of bits | Description |
|---|---|---|
| Xres | 16 | Horizontal image resolution, in pixels. |
| Yres | 16 | Vertical resolution, in pixels |
| X | 16 | Current value of X |
| Y | 16 | Current value of Y |
| FUCoreMode | 32 | Inclusive OR of operating modes (Z compare, blend, reserved*) |

Figure 3:
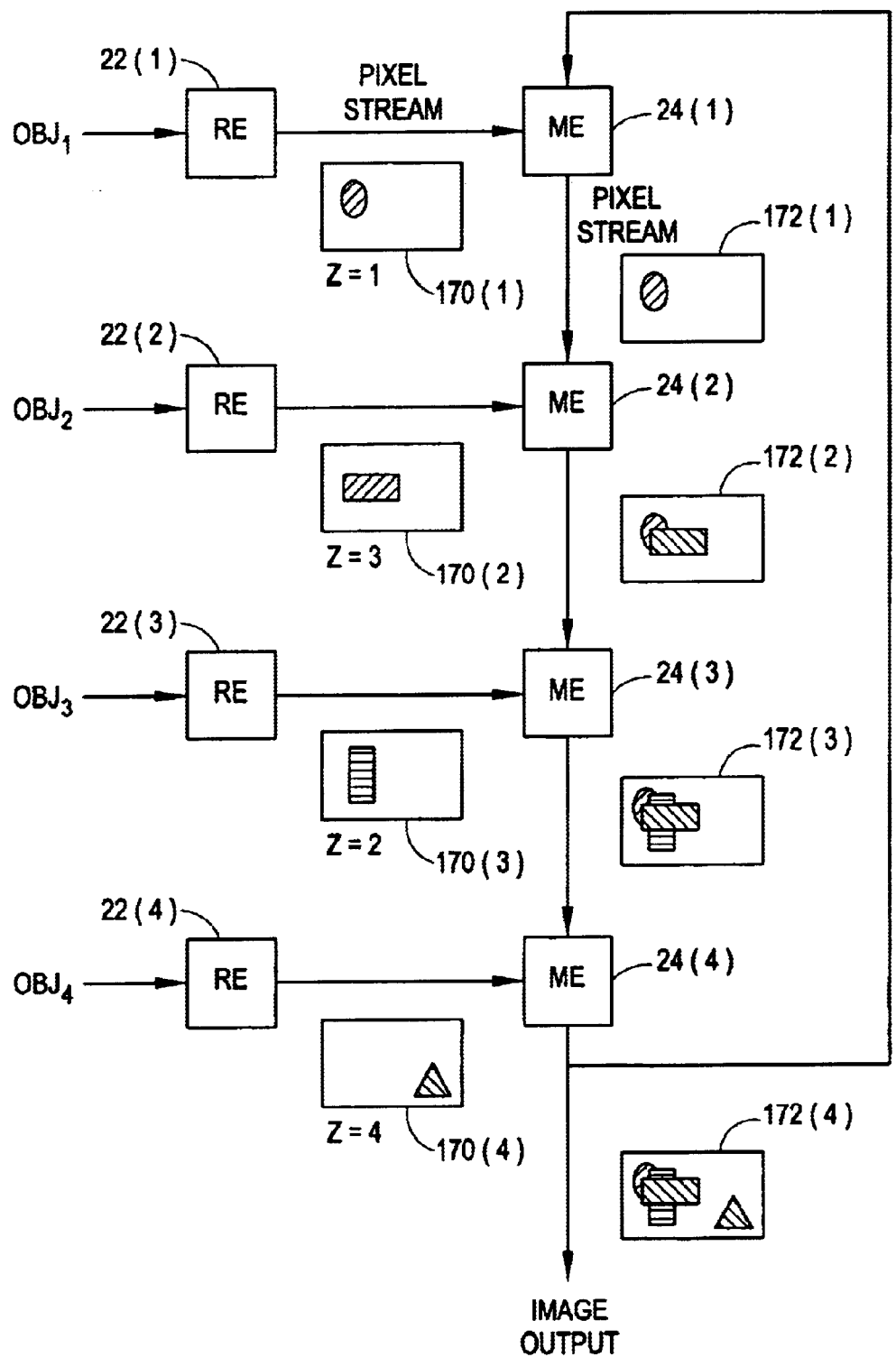
FIG. 3 is a block diagram illustrating an image composition process according to the present invention.

An image generation operation using the image generator of FIG. 1 with the merge engine of FIG. 2 will now be described with reference to FIG. 3. There, a four stage image generator is shown (i.e., N=4). For simplicity, the merge engines 24 are shown with direct connections, but it should be understood that these connections might well be via pixel bus 28. Each stage, or thread, of the parallel image generation process comprises a rendering engine (RE) 22 and a merge engine (ME) 24. Each stage might be implemented on a different host running different threads of a multithreaded program, as explained below in connection with FIG. 4.

In this example, each stage processes one shape and those shapes are a circle, two rectangles and a triangle. Image controller 20 (see FIG. 1) passes an object description of the circle to rendering engine 22(1) along with a command to initiate rendering of the circle. Typically, the object description of a circle includes a location for the center of the circle and a radius in the screen coordinate space, along with a description of the surface of the circle. The description of the circle's surface could be as simple as a solid color, but more often it is a complex description, possibly including a texture or a description of the reflectancetransmission properties assigned to the object and a description of the light sources or shadows impinging on the object.

Image controller 20 also passes the three other objects to their respective stages for parallel processing. As rendering engine 22(1) determines blocks of pixel color values, it outputs those blocks as a pixel stream to merge engine 24(1) and eventually outputs all pixel values comprising part image 170(1). Rendering engines 22(2)–(4) do the same, outputting part images 170(2)–(4) in parallel as they are generated.

Along with the pixel values, rendering engines 22 preferably also output Z values for the pixels, where a Z value for a pixel indicates the depth of the portion of object represented by that pixel. Merge engines 24 use the Z values to determine when one object obscures another. For the purposes of illustration, each of the objects are placed at constant depths, with objects $OBJ_1$-$OBJ_4$ being at depths of 1, 3, 2 and 4, respectively. Here, a lower Z represents a depth further from the view point. This is reflected in the fact that in the final image, $OBJ_1$ (the circle at z=1) is obscured by $OBJ_2$ (the rectangle at x=3) and $OBJ_3$ (the rectangle at x=2).

Figure 4:
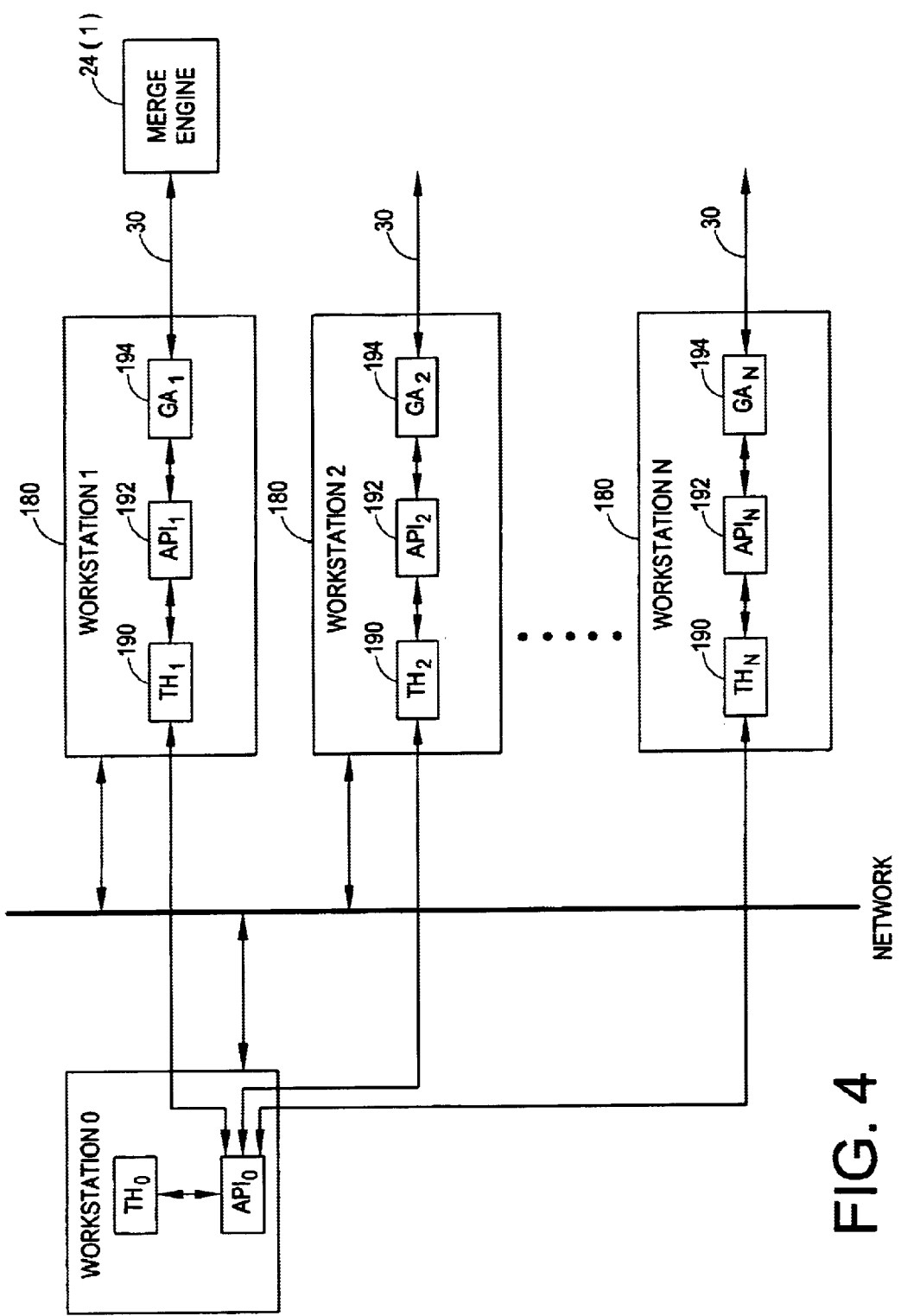
FIG. 4 is a block diagram of a parallel image generator implemented with multiple workstations.

In one embodiment, each stage is supported by one workstation and various threads of a multiprocessing program are parsed out to the workstations. FIG. 4 shows details of one such system. There, one workstation controls the overall image generation process by running a program thread ($TH_0$) that communicates with threads in other workstations 180 over a network interconnecting the workstations. APIo distributes rendering commands from $TH_0$ among the set of threads $TH_1$ through $TH_N$ 190 running on workstations 1 through N. Each thread THi relays the rendering commands, with minimal overhead, to an $API_i$ 192 on workstation i, which can be an unmodified OpenGL API that drives a single graphics accelerator card $GA_i$ 194. In this configuration, off-the-shelf workstations and graphics accelerator cards can be used for image generation, which greatly reduces the cost of the system. The marginal costs of the image generation process might be reduced even further if the workstations and graphics accelerators are used for other purposes. All that would normally be needed to be added is suitable software for control of the various elements of the system and N merge engines with their connections to a network such as a ServerNet® network bus. Since an existing ASIC can be used to interface the merge engines to the network bus, as explained above, design costs are minimized.

Referring again to FIG. 4, a user or user application interacts with process thread $TH_0$. Thread $TH_0$ accesses the set of N graphics accelerator cards ($GA_i$) 194 housed in some N workstations (or fewer than N if multiple graphics accelerator cards can be installed in one or more workstations) via application program interface $API_0$ on workstation 0 that is running $TH_0$. $API_0$ distributes the rendering information to the graphics accelerators by communicating with a set of N threads ($TH_i$). Each thread invokes a local API to drive a graphics accelerator to produce an image in a frame buffer and this image is provided to the thread's corresponding merge engine. This image is passed over a private bus to a merge engine (e.g., merge engine 24(i)) and is fed from it into a ServerNet®-based pathway of merge engines. The final merge engine, 24(N) deposits the fully processed image back into the final frame buffer, or a dedicated frame buffer, from where the image can be sent to a display.

Using the workstation arrangement shown in FIG. 4, there are several data paths that might be bottlenecks under certain conditions. The bandwidth of the various data paths should be considered in the design of an image generator so that a bottleneck does not eliminate the speed benefits of other enhancements.

One data path of concern is the network path between $API_0$ and the various threads. A typical graphics accelerator today has a peak throughput of a few million triangles/second, but assuming a realistic utilization of 25%, or 250,000 triangles, the bandwidth from $API_0$ to each thread 190 would be between 2.5 and 5 MBS, assuming that texture data has been preloaded and is locally available to each accelerator card 194. If multiple accelerators are housed in a single multiprocessor workstation, this bandwidth can be easily supported through the memory system. When $API_0$ is in a separate workstation from the threads, local network links can easily carry the data traffic, over a ServerNet® network bus or some other network, so that data path is not a problem.

If the links between workstation 0 and workstations 1 through N cannot handle the required bandwidth, the application might be designed with explicit parallelism in mind, either as a SPMD (Single Program, Multiple Data) program or MIMD (Multiple Instruction, Multiple Data) program. Using that approach, thread $TH_0$ and $API_0$ cooperate to send high level instructions to threads 190 that are application threads. The model data is distributed in such a way that it is available locally to threads 190 and does not have to be transferred between $API_0$ and threads 190. Using this ap proach, thread $TH_0$ sends instructions to the other threads 190 to manipulate the model or viewing position and threads 190 perform local updates to the model data and initiate the rendering commands that drive their APIs 192. That way, the image generation is not limited by the inter-workstation bandwidth, since a model can be, for example, rotated in real-time simply by broadcasting a change of viewing position, which can be defined by 24 bytes. The bandwidth needed between $API_0$ and threads 190 is only these 24 bytes, since the model itself is located on the workstations that contain the graphics accelerators.

The above-described architecture is easily realized by a cluster computer configuration in which all of the workstations are connected by a ServerNet® network bus (which can be the same ServerNet® network bus as the bus carrying merge engine-to-merge engine traffic, or a separate bus).

In such a configuration, the connections among the merge engines could be realized by the ServerNet® links and switches. Although such a configuration would be more expensive than a pipelined configuration it would be a natural way to perform rendering on a cluster computer that was already ServerNet®-connected. It would also be an appropriate way to build a fault-tolerant rendering system, and this could be important for real-time applications that require high reliability, such as flight simulators and location based entertainment. For visualizing scientific applications on cluster computers the most desirable configuration would combine a pipelined architecture, using dedicated ServerNet® links, with a general purpose ServerNet® network used for all other communication.

Figure 5:
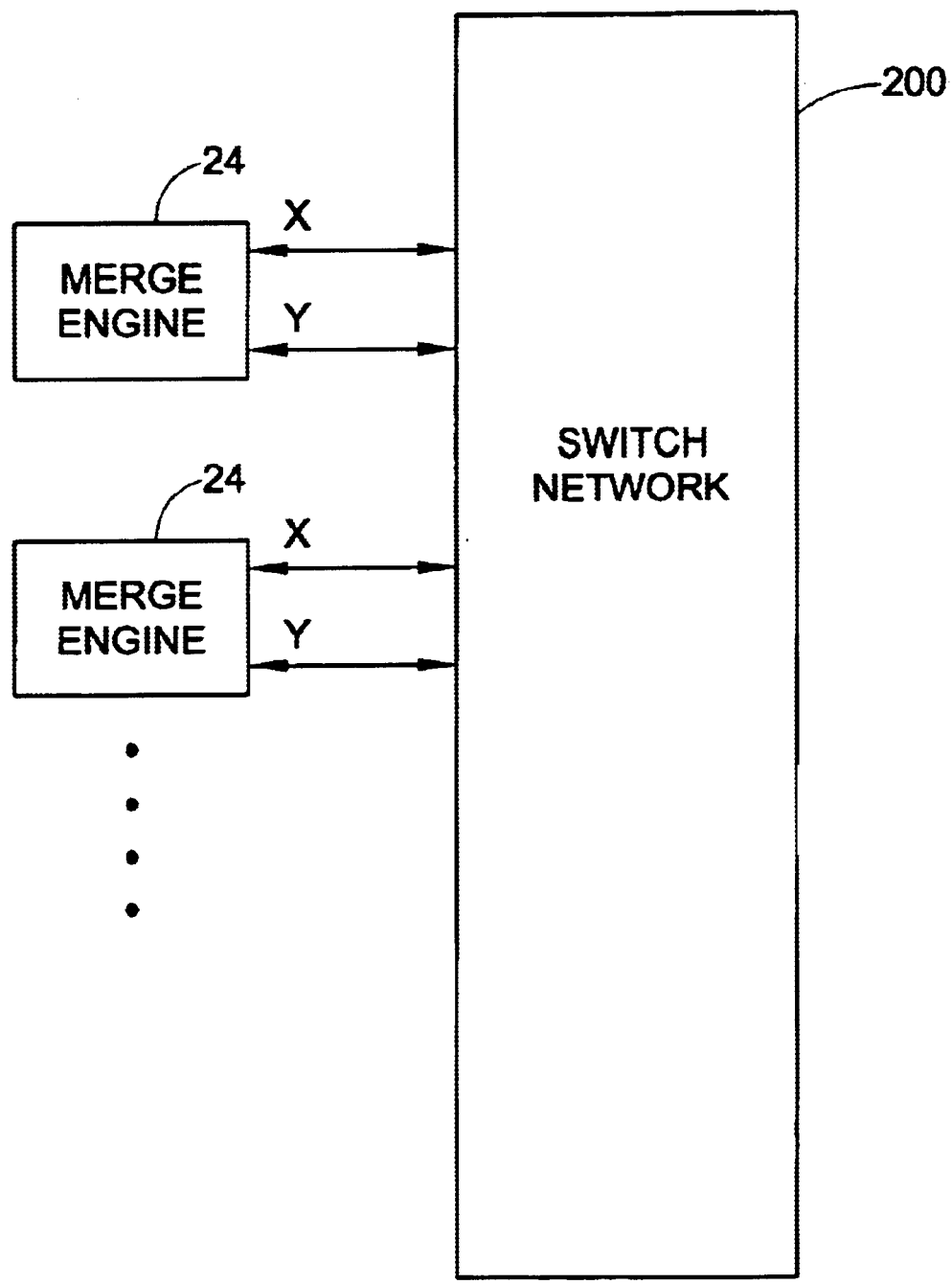
FIG. 5 is a block diagram illustrating the use of a switch network.

In the above descriptions of the merge pathway (i.e., the order of traffic flow between merge engines), the pathway is from merge engine 24(1) to merge engine 24(2), and so on, to merge engine 24(N) and then to merge engine 24(1). In another embodiment, illustrated in FIG. 5, the order of the merge engines in the pathway is not fixed, but is controlled by a switch network 200. In some cases, switch network 200 might be a physical message router, while in other cases, switch network 200 is implemented by dynamically modifying the merge engines addresses on pixel bus 28 or the destinations of their message.

One use of a dynamically ordered merge pathway is to allow for noncumulative operations, as might be needed for handling fog and transparency in an image. In some implementations, it may be appropriate to combine pipelined and switched configurations. The pipelined configurations are scalable and inexpensive, while the fault tolerant configuration is appropriate for high reliability applications including flight simulation and location based entertainment. The fault tolerant configuration provides double the link bandwidth of the pipelined configuration because it allows ServerNet® channels to comiunicate in two directions simultaneously.

In switched configurations, the merge engines (specifically, the x and y ports of ASIC 102) are connected to a ServerNet® switch that is a 300 nanosecond latency crossbar with 15 gigabit bisection bandwidth (in current implementations). Data flows bi-directionally on both the x and y links, with the upstream and downstream traffic split across the two links. In switched configurations that use bi-directional pathways, the arbiter is responsible for merging the results of an incoming stream that has been split across two links.

The above description illustrates several examples and variations of a parallel image generator using pipelined merge engines. Several other considerations should be taken into account to ensure that the best performance is obtained. For example, in building a system using off-the-shelf graphics accelerators, the overall system is constrained somewhat by the functions of those graphics accelerators. For example, if fog and alpha blending are required of the overall system, the system should be designed with graphics accelerators that handle those functions, since a merge engine might not be able to handle fog and alpha blending if the graphics accelerator does not provide enough information, such as alpha data.

As with any parallel computation, the effective speedup will be limited by the achievable load balance. A virtue of the image composition approach described herein to achieving scalability, in contrast to other architectures, is that there is no subdivision of the image at any point in the architecture. This makes it possible to distribute the computational work using a randomization strategy. Of course, if there are bandwidth or other constraints, dividing the image up and having more than one independent image generator work on each subimage might be desirable. From the central limit theorem, an expected value of load balance under such strategies can be predicted if the variance of the workload distribution is known. It is possible to predict effective load balance using off-line simulation, and this would be valuable in order to verify the operation of the system as well as to predict performance.

Yet another consideration is frame rateresolution. Image resolutions range from a low of 640×480 pixels, used in video games and current television standards, through 2000×1000 for HDTV imagery, and higher for flight simulators and high-end film animation. Table 5 identifies some target frame rates and resolutions along with corresponding bandwidth requirements. The data requirements vary from 5 to 8 bytes per pixel depending on the resolution of the Z buffer (2, 3 or 4 bytes) and whether an alpha channel is included.

TABLE 5

| APPLICATION | RESOLUTION | DATA PER FRAME (MB) | TARGET FRAMES/SEC | BANDWIDTH (MBS) |
|---|---|---|---|---|
| Games | 640 × 480 | 1.5–2.5 | 30 | 45–75 |
| CAD | 1280 × 1024 | 6.5–10.5 | 10 | 65–105 |
| HDTV | 2000 × 1000 | 10–16 | 30 | 300–480 |
| Flight simulators | 1700 × 1350 | 11.5–18.5 | 30+ | 345–555 |

Where frame rates are limited by available bandwidth, the bandwidth can be increased by using multiple rendering systems with duplicate model data, with each system rendering a portion of each frame. The results are then combined to make a full frame. Alternately (but perhaps more problematically) each system could render alternating frames in a round-robin sequence.

Bandwidth requirements decrease for decreasing target frame rates. This may be a reasonable compromise for some applications, such as high quality animation, where a 20 frame-per-second solution is useful (although less valuable than a 30 frame-per-second solution). This compromise should be acceptable for non-interactive applications.

In addition to bandwidth concerns, latency should also be considered. The rendering process incurs latency in three stages: first, while application threads prepare data for the graphics accelerators; second, while graphics accelerators generate pixel and Z data for the frame buffers; and third, while the frame buffer data flows through the pathway of merge engines to produce a final image. If the combined latency from these stages is too high (roughly, above 100 ms) then interactive users will experience motion sickness. Since the threads will introduce some latency, and the graphics accelerators may typically introduce additional latency, the merge pathway should nominally operate within a 30 ms time window. The total pathway latency, $L_T$, for an N stage pipeline is:

$$L_T = L \times (N + P - 1)$$

where L is the latency of each stage and P is the number of packets or pixels being processed. Although the merge pathway will work with packets that are multiples of 64 bytes each, an equivalent expression can be stated in terms of pixels. The above expression can be used to evaluate the maximum latency, L, per pixel that can be tolerated while processing images with varying numbers of pixels. The total pathway latency, $L_T$, is approximately L×P since (N−1)<<P. Table 6 shows this maximum latency per pixel and the target frequency with which pixels would have to be processed, in order to achieve 30 ms latency in the merge pathway for given resolutions.

TABLE 6

| Resolution | Latency/pixel | Frequency |
|---|---|---|
| 640 × 480 | 97.6 ns | 11 MHz |
| 1280 × 1024 | 22.9 ns | 44 MHz |
| 2000 × 1000 | 15.0 ns | 67 MHz |
| 1700 × 1350 | 13.1 ns | 77 MHz |

Those frequency targets can be achieved in three ways: by adjusting the clock rate of merge engine logic 100 subject to available bandwidth on pixel bus 28; by parallelizing the data pathways in merge engine logic 100 (subject again to available pixel bus 28 bandwidth); or by deploying multiple merge pathways in parallel, subject to available bandwidth through the PCI bus and host subsystems.

In the first generation of the Colorado ASIC, 38 MBS of unidirectional raw data bandwidth is available. In the next generation, 230 MBS will be available bi-directionally, rising to over 1 GBS in subsequent generations, which should accommodate most applications. Even with the first generation, if more bandwidth is needed, one approach is to deploy multiple merge pathways in parallel. It is probably feasible to use two such pathways in a dual peer PCI host like the Compaq workstation 6000 or Digital Alpha workstations.

Another approach is to use data compression between the merge engines, as described in an above-referenced co-filed patent application, to increase the effective bandwidth of pixel bus 28.

Figure 6:
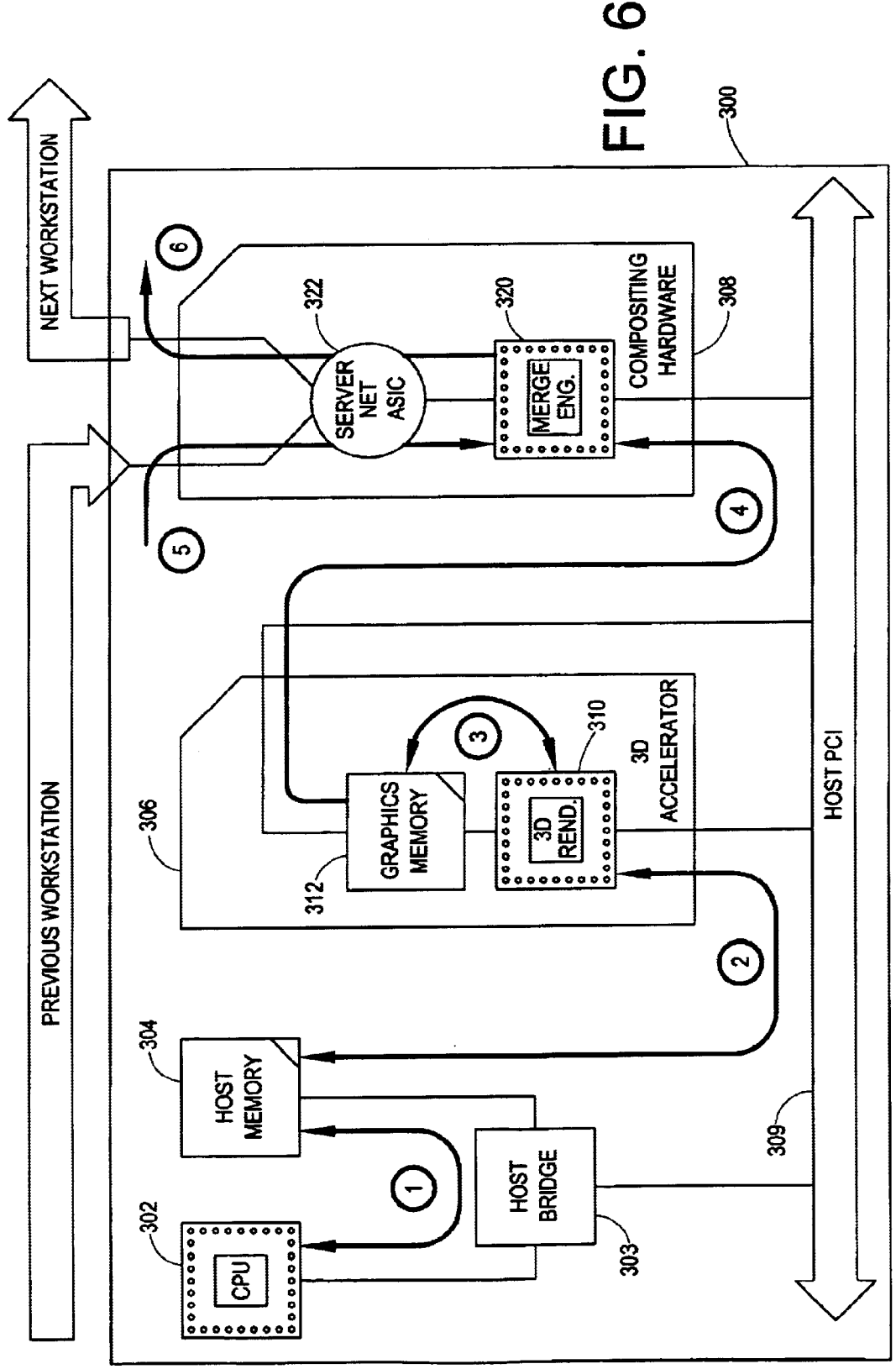
FIG. 6 is a block diagram of a specific implementation of a merge engine node in a parallel pipeline graphics processor.
Figure 7:
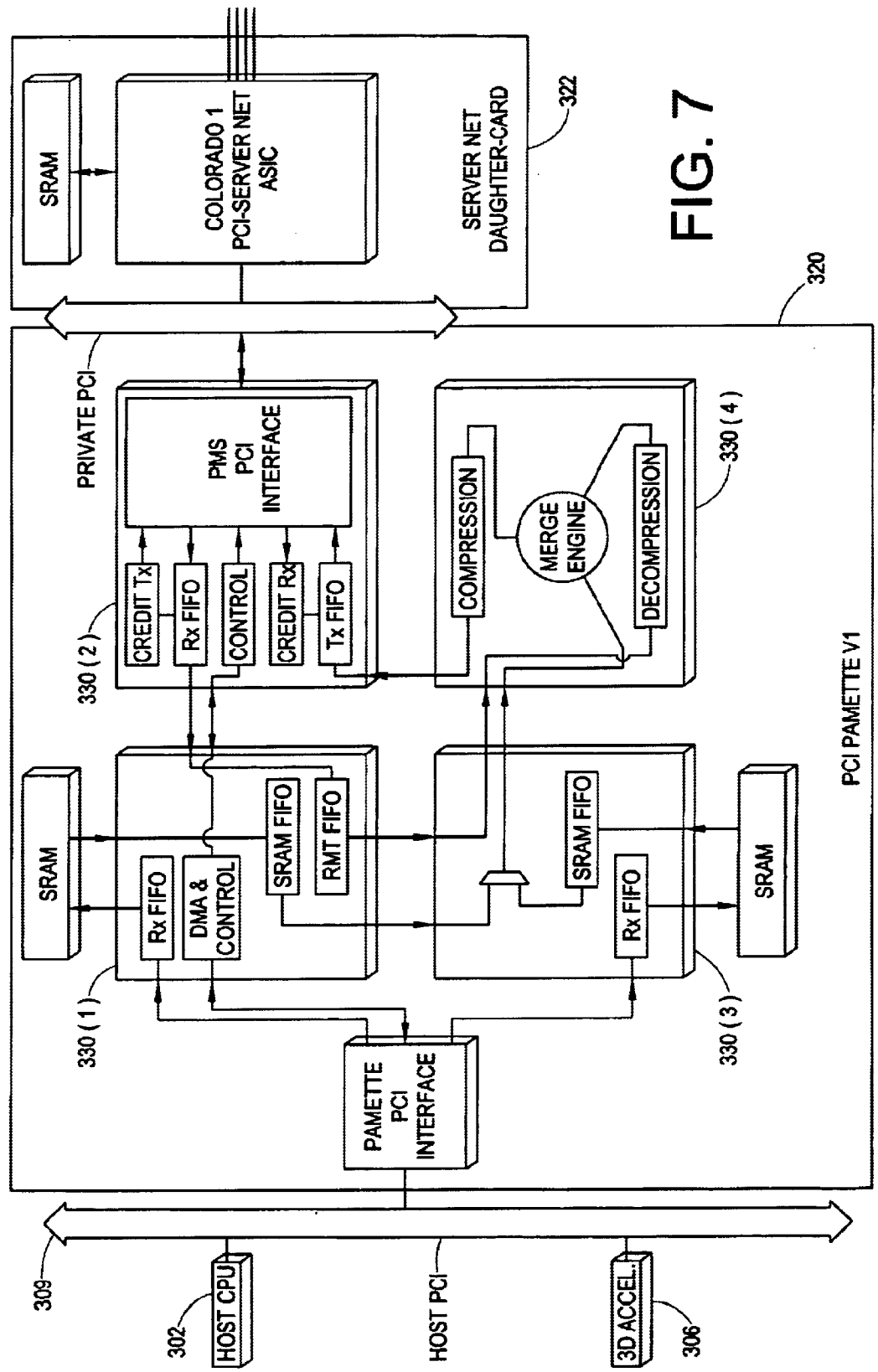
FIG. 7 is a more detailed block diagram of the merge engine shown in FIG. 6.
Figure 8:
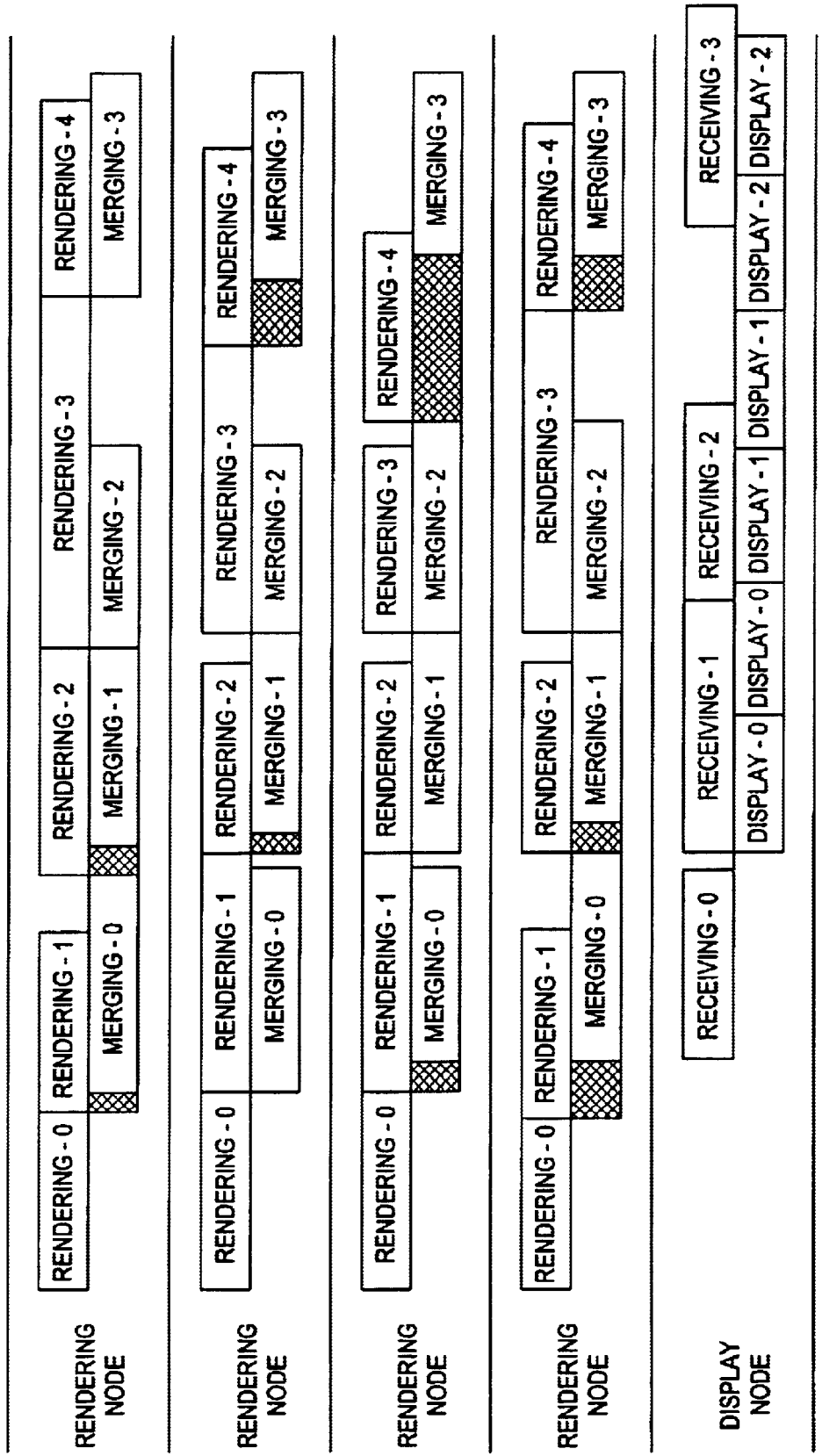
FIG. 8 is a timing diagram illustrating the pipelining of the graphics process performed by the processor shown in FIGS. 6–7.

FIGS. 6–8 illustrate a specific implementation of a graphics processor according to the present invention. FIG. 6 is a high-level block diagram of the components that make up one node processor 300. In this implementation, node processor 300 is hosted by a workstation (not shown) that is connected to other workstations via a ServerNet® network, with logical channels coupling processor node 300 to its two nearest neighbors, a previous workstation and a next workstation. As explained above, a processor node can be a rendering node, a display node or both. Also, as explained above, the order of the nodes can be dynamically altered by altering the logical connections between workstations. As shown in FIG. 6, node processor 300 includes a CPU 302, coupled via a host bridge 303 to a host memory 304, a 3D accelerator card 306 and a compositing card 308. The coupling is provided by a host PCI bus 309. 3D accelerator 306 is shown comprising a 3D rendering chip 310 and a graphics memory 312. Compositing card 308 is shown comprising a merge engine chip 320 and a network interface chip 322 (a Colorado ASIC for interfacing to a ServerNet® network).

The standard data path within node processor 300 is shown by the numbered arrows. Using its local data or data provided externally, CPU 302 prepares 3D data and stores it in host memory 304 (arrow 1). That data is sent, as OpenGL commands, over host PCI bus 309 to 3D accelerator card 306 (arrow 2). 3D rendering chip 310 then executes the OpenGL commands and renders 3D objects to graphics memory 312 (arrow 3).

In a typical graphics processor, at this point the color data are read out of memory 312 and displayed. However, here the data is sent to the merge engine (arrow 4). The preferred way for merge engine 320 to read data from graphics memory 312 is through a private interface as shown in FIG. 6. This method is preferred because it alleviates the host PCI bus from supporting the bandwidth required for this data transfer.

Another way for merge engine 320 to read data from graphics memory 312 is to program merge engine 320 to perform direct memory access (DMA) using the PCI interface, rather than having 3D accelerator 306 DMA the data or doing a transfer via a main memory. While this is a good approach if such capability is available, it might not always be available. For example, if and AGP 3D accelerator that implements Intel's AGPSets, PCI-to-AGP DMA reads would not be supported.

In experiments, the best performance of a 3D accelerator card that uses the Evans & Sutherland RealImage 2100 chip set is obtained with bursts of four 32-bit words and a number of wait states between transactions that depends on the direction of the data transfer. As explained above, the typical data set includes color (RGB), transparency ($\alpha$) and depth (z). Preferably, this data set is received in a scan-line fashion simultaneously from the graphics memory 312 and from the upstream node (arrow 5). The merge function actually applied to the local data and the upstream data is user-configurable, as explained above. Merge engine 320 applies the merge function in use to the local data and the upstream data and then sends the resulting merged data set to the downstream node (arrow 6).

Processor node 300, in this specific embodiment, is a Compaq workstation, such as an IA32, or an Alpha processor-based workstation running Microsoft's Windows NT operating system, 3D accelerator card 306 is a Compaq PowerStorm™ 300 3D accelerator, and compositing card 308 comprises a Compaq PCI Pamette card (marketed as Compaq's "PCI Development Platform"), version 1, revision 2, using 4 user-programmable FPGA's (part number XC4044XL-1, marketed by Xilinx). Compositing card 308 also includes a custom Compaq ServerNet® PMC daughter card for the PCI to ServerNet® network interface.

In a network of multiple processor nodes, the task of rendering is spread over all the processor nodes. In a "sort-last-full" approach, each processor node operates on the entire image, but only with a subset of the objects. The merge engines then merge these individual images together. In a "sort-middle" approach, each processor node processes all the objects, but only for a part of the screen attributed to that processor node. In that case, the merge engines are used to tile together the results from the individual processor nodes. The latter approach is useful for parallel ray tracing.

The logical topology for the network is the chain, wherein each node has one input data stream and one output data stream, but other topologies can be used, such as a loop, or a tree. A loop, or ring, is just a chain with the two chain ends closed to each other. A loop is useful where the data has to be recirculated in the rendering system.

While a tree provides lower latency, it requires more network bandwidth, which is often a scarce resource. However the nodes are connected, it can be useful to connect all the network inputs and outputs to a switch so that the order of the nodes can be arbitrarily reordered. Dynamic reordering is useful where merging operations require a specific order and that order changes, such as when the viewpoint changes.

FIG. 7 shows the components of merge engine 320 in more detail, including a separation of various components according to which of the four FPGA areas 330(1)–(4) is used for the components.

A graphics system using processor nodes 300 can pipeline processing very aggressively. With double buffering for the color and depth buffers, pipelining as shown in FIG. 8 can be obtained. On each node, rendering can start as soon as both the previous rendering and the previous merging are finished. Merging can begin as soon as the previous rendering and the previous merging are finished, but may stall if upstream data is not received or there is no space downstream to store the results (shown in FIG. 8 by cross-hatching). Because of the node-to-node flow control, no broadcast is needed to stop and start the data flow. This way, even on a system with a high node count (such as 128 nodes or more), stalls stay local and the data flow resumes with a latency of one node.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A computer system for image composition, wherein an image is represented by a two-dimensional array of pixels, each pixel having data associated therewith including a color value and a position in the two-dimensional array, image composition being the process of forming a final image, the computer system comprising:

a plurality of a node computers;

a pixel bus coupling the plurality of node computers; and wherein each node computer comprises a merge engine wherein the merge engine comprises a local input for local pixel data, a neighbor input for upstream pixel data from a neighbor merge engine and a pixel output, and wherein each merge engine further comprises a first plurality of registers for control, status, and address information and a second plurality of registers identical to the first plurality, only the second plurality of registers for each merge engine configured to be selectively modified by other merge engines via the pixel-bus.

2. The computer system of claim 1, further comprising a switch network coupling the merge engines, wherein the switch network includes logic to associate merge engines as neighbors.

3. The computer system of claim 1, wherein each merge engine is programmable for a set of merge operations, the merge operations including pixel differences, min, max, dissolve and color filtering.

4. The computer system of claim 1, further comprising a network over which pixel data is routed between node computers.

5. The computer system of claim 4, wherein the network is configured to broadcast pixel data when such a broadcast is needed in a multi-pass rendering process.

6. An image generator comprising:

a plurality of rendering nodes;

a network coupling the rendering nodes such that each node is coupled to the next node and a previous node; and wherein each rendering node of the plurality of nodes includes:

(a) a processor for generating graphics commands, (b) a rendering engine for rendering image parts based on graphics commands received from the processor, and (c) a merge engine coupled to the rendering engine to receive local pixel data and coupled to the next node to send merged pixel data to the next node, wherein each merge engine comprises a first plurality of registers for control, status, and address information and a second plurality of registers identical to the first plurality, only the second plurality of registers for each merge engine configured to be selectively aeecssed or modified by other merge engines via the network.

7. The image generator of claim 6, further comprising switch logic within the network for dynamically reordering rendering nodes to reorder the association of at least one rendering node and the next node of that rendering node and the previous node of that rendering node.

8. The image generator of claim 6, ftirther comprising a display node, wherein the display node includes logic to receive an image from a final rendering node and circuitry to display the image.

9. An image generator, comprising:
   one or more workstations;
   an image controller implemented as a distributed program;
   a plurality of rendering engines; and
   a plurality of merge engines some or all of which having a data path therebetween, wherein the data path is realized as a daisy-chained bus connection or switch network that can control the order of data traffic flow between the plurality of merge engines, wherein at least one of the plurality of merge engines is designated as an output merge engine for providing a final merged image, wherein each merge engine comprises a first plurality of registers for control, status, and address information and a second plurality of registers identical to the first plurality, only the second plurality of registers for each merge engine configured to be selectively modified by other merge engines via the daisy-chained bus coinection or switch network.

10. The image generator of claim 9, wherein each of the plurality of merge engines is adapted to produce merged pixel data prior to receipt of all upstream pixels'data, and wherein pixels forming part images and data forming merged images are streaming from the respective rendering engines and merge engines as they becomes available.

11. The image generator of claim 9, wherein the data path is a high speed pixel bus including a Service Area Network.

12. The image generator of claim 9, wherein the number of workstations over which the image controller can be distributed is related to a number of rendering thread in the distributed application that, in turn, is related to an image rendering processing speed.

13. The image generator of claim 9, wherein each of the plurality of merge engines is configured with a merge engine logic and a merge engine interface circuit linked to the data path for connecting neighboring merge engines.

14. The image generator of claim 13, wherein the merge engine logic includes a core that operates on pairs of pixels streaming from the associated rendering engine through a part image bus and from a neighboring merge engine through the merge engine interface circuit.

15. The image generator of claim 9, wherein each status register comprises at least one group identifier.

16. An image generation method comprising:
   instantiating an image controller program that is implemented as a multithreaded program;
   instantiating a user application that interacts with a first thread of the image controller program for providing rendering information;
   invoking an application program interface, the first thread accessing a set of graphic accelerator cards via the application program interface;
   instantiating a set of threads, the application program interface distributing the rendering information by communicating with the set of threads, each thread in the set of threads invoking a local application program interface to drive a respective graphic accelerator for producing an image that is passed to a merge engine corresponding to that thread, wherein a final merge engine in a merge pathway deposits a fully processed image in a buffer from which the fully processed image is retrievable by a display; and
   dynamically modifying only one of at least two sets of identical control, status, and address registers within a first merge engine through a second merge engine on the merge pathway.

17. An image rendering system comprising:
   a plurality of objects to be rendered in an image, the plurality of objects comprising at least first and second objects;
   a plurality of rendering engines for rendering the objects and generating associated object pixel data;
   a plurality of merge engines for merging the first and second rendered objects according to a predetermined set of rules;
   a pixel data bus connecting the plurality of merge engines to each other; and
   wherein each merge engine comprises a first plurality of registers for control, status, and address information and a second plurality of registers identical to the first pluralitv, onlv the second plurality of registers for each merge engine configured to be selectively modified by other merge engines via the pixel data bus.

* * * * *